United States Patent
Nallamotu et al.

(10) Patent No.: US 12,499,413 B2
(45) Date of Patent: Dec. 16, 2025

(54) AUTONOMOUS MOBILE ROBOT BASED MATERIAL MOVEMENT SYSTEM AND METHOD

(71) Applicant: Dematic Corp., Grand Rapids, MI (US)

(72) Inventors: Durgaprasad Nallamotu, Cumming, GA (US); James Mumma, Sr., Moorestown, NJ (US); Eric Gatchalian, Ada, MI (US); Raja Ramnarayan, Atlanta, GA (US)

(73) Assignee: Dematic Corp., Grand Rapids, MI (US)

( * ) Notice: Subject to any disclaimer, the term of this patent is extended or adjusted under 35 U.S.C. 154(b) by 913 days.

(21) Appl. No.: 17/707,114

(22) Filed: Mar. 29, 2022

(65) Prior Publication Data
US 2022/0309447 A1    Sep. 29, 2022

Related U.S. Application Data

(60) Provisional application No. 63/167,261, filed on Mar. 29, 2021.

(51) Int. Cl.
*G06Q 10/087*    (2023.01)
*G05B 19/042*    (2006.01)

(52) U.S. Cl.
CPC ......... *G06Q 10/087* (2013.01); *G05B 19/042* (2013.01); *G05B 2219/50391* (2013.01)

(58) Field of Classification Search
CPC ............... G06Q 10/087; G05B 19/042; G05B 2219/50391
See application file for complete search history.

(56) References Cited

U.S. PATENT DOCUMENTS

2015/0360865 A1    12/2015    Massey
2018/0072212 A1    3/2018    Alfaro et al.
(Continued)

FOREIGN PATENT DOCUMENTS

WO    2021038437 A1    3/2021

OTHER PUBLICATIONS

International Search Report and Written Opinion of the International Searching Authority from corresponding Patent Cooperation Treaty (PCT) Application No. PCT/IB2022/052888, indicated completed on May 30, 2022.
(Continued)

*Primary Examiner* — Jacob S. Scott
*Assistant Examiner* — Erin Morris
(74) *Attorney, Agent, or Firm* — Gardner, Linn, Burkhart & Ondersma LLP

(57) ABSTRACT

An automated warehouse material movement system and method of moving material in a warehouse, includes a computer based warehouse executive subsystem (WEX) that is programed with computer code to maintain inventory location and quantity information, schedule inventory movement and track inventory movement within the warehouse and a computer based mobile robot automation subsystem (MAS) that is programed with computer code to maintain information of floor layout of the warehouse, maintain information on mobile robots in the warehouse, allocate and deallocate mobile robots to particular missions, control and track movement of mobile robots and provide situational reporting of the mobile robots. A computer based vehicle tasking subsystem (VTS) is programed with computer code to respond to mission commands from the WEX to issue commands to the MAS to reserve and schedule mobile robots including movement of inventory between a source and a destination within the warehouse and to report status (Continued)

information from the MAS to the VTS regarding status of missions. At least one microservice component is configured to be tightly designed, stateless and loosely coupled with said WEX and MAS. The VTS is the at least one microservice component.

20 Claims, 4 Drawing Sheets

(56) References Cited

U.S. PATENT DOCUMENTS

| | | | |
|---|---|---|---|
| 2019/0034839 A1* | 1/2019 | Hance | B65G 1/0492 |
| 2019/0233213 A1* | 8/2019 | Phan-Quiroga | B65G 1/0492 |
| 2020/0061839 A1 | 2/2020 | Deyle et al. | |
| 2020/0209816 A1* | 7/2020 | Cebasek | G05B 19/042 |
| 2022/0036302 A1* | 2/2022 | Cella | G06N 20/00 |

OTHER PUBLICATIONS

Applied Sciences article entitled, "Mobile Robot Path Optimization Technique Based on Reinforcement Learning Algorithm in Warehouse Environment", by HyeokSoo Lee and Jongpil Jeong, published Jan. 28, 2021.

* cited by examiner

AUTONOMOUS MOBILE ROBOT BASED MATERIAL MOVEMENT SYSTEM AND METHOD

CROSS REFERENCE TO RELATED APPLICATION

The present application claims priority of U.S. provisional application Ser. No. 63/167,261 filed Mar. 29, 2021, which is incorporated herein by reference in its entirety.

BACKGROUND OF THE INVENTION

The present invention is directed to warehouse automation and, in particular, to movement of inventory/material throughout a warehouse. While the invention is illustrated for use with autonomous mobile robot (AMR) based systems it should be understood that this term broadly includes automated guidance vehicle (AGV) based systems.

Automated guided vehicles (AGV's) have long been a successful solution to automatically move material to, from, and through manufacturing facilities, warehouses, distribution centers and other applications. The AGV has evolved with new navigation technology, physical size/payload capabilities, environments and routing abilities and are now often referred to as autonomous mobile robots (AMR). The difference between AGVs and AMRs is one of degree and for the purpose of this document a reference to one shall include the other.

AMR vehicles are supplied in systems with multiple vehicles controlled in unison in a warehouse by an AMR Robot Controls System (RCS). The AMR Robot Controls System (RCS) Software Module maintains knowledge of the warehouse layout as well as the location and status of all of the AMR vehicles. A warehouse also has Warehouse Management System (WMS) that is responsible for overall control of inventory in the warehouse. The Warehouse management system and the AMR Robot Controls System (RCS) are in communication in order to move inventory about the warehouse as required such as to maintain adequate stock of inventory in desired locations.

SUMMARY OF THE INVENTION

The present invention provides an automated warehouse material movement system and method of moving material within a warehouse that can readily be adapted to particular applications as well as changes to the existing system. The Warehouse Management Systems (WMS) are supplied by multiple vendors and AMR systems are supplied by a variety of vendors usually different from the vendor of the warehouse management system. This allows the system integrator to specify the equipment from vendors that are ideal for the application. In addition, because both the warehouse management system and the AMR Robot Controls System (RCS) Software are programmed computer based systems. Even identical warehouse management systems and AMR Robot Controls System (RCS) Software Module can be programmed with different versions of the same operating system and application software. So it is a labor intensive effort to prepare and maintain interface software between the warehouse management system that is specific to every warehouse application and needs to be updated for different operating system and application software versions, changes to the warehouse layout and the like.

An automated warehouse material movement system and method of moving material in a warehouse, according to an aspect of the invention, includes a computer based warehouse executive subsystem (WEX) that is programed with computer code to maintain inventory location and quantity information, schedule inventory movement and track inventory movement within the warehouse and a computer based mobile robot automation subsystem called Mechatronics Automation Subsystem (MAS) that is programed with computer code to maintain information of floor layout of the warehouse, maintain information on mobile robots in the warehouse, allocate and deallocate mobile robots to particular missions, control and track movement of mobile robots and provide situational reporting of the mobile robots. A computer based vehicle tasking subsystem (VTS) is programed with computer code to respond to mission commands from the WEX to issue commands to the MAS to reserve and schedule mobile robots including movement of inventory between a source and a destination within the warehouse and to report status information from the MAS to the VTS regarding status of missions. At least one microservice component is configured to be tightly designed, stateless and loosely coupled with the WEX and MAS. The VTS is the at least one microservice component.

The at least one microservice component may be parametrically configured to a particular application. The at least one microservice component may respond to language grammar to produce actionable movement. The microservice component may produce a data stream related to the completion of action steps. The at least one microservice component may comprise a plurality of microservice components. The plurality of microservice components may be a warehouse execution system and/or a supply chain execution system.

Aspects of the invention are based on application of systems engineering principles and practices to an application lifecycle model (ALM) in a reimaging of existing software packages in support of the gradual refactoring of intellectual property (IP) into a well-defined system-of-systems dedicated to a specific enterprise context including a collection of tightly defined components interacting in a loosely coupled manner and free from side-effect.

These and other objects, advantages, purposes and features of this invention will become apparent upon review of the following specification in conjunction with the drawings.

BRIEF DESCRIPTION OF THE DRAWINGS

FIGS. 2-1 through 2-7 are illustrations of various types of autonomous mobile robots useful with the invention;

FIG. 3 is a block diagram illustrating the interface between the warehouse executive subsystem, the vehicle tasking subsystem and the mechatronics automation subsystem; and FIG. 4 is a block diagram of one configuration of the vehicle tasking subsystem for point-to-point transport.

DESCRIPTION OF THE PREFERRED EMBODIMENTS

Figure 1:
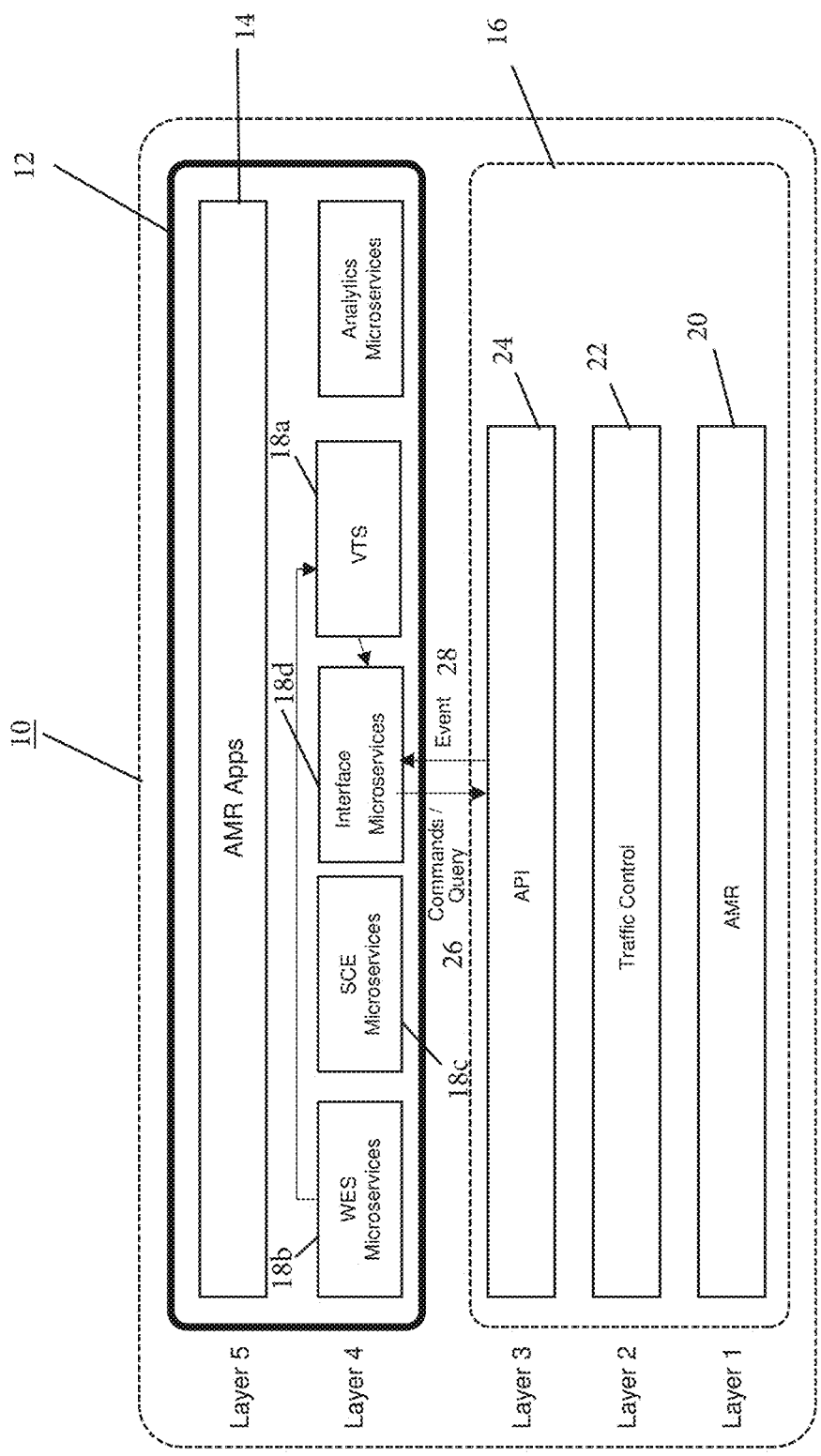
FIG. 1 is a block diagram of warehouse system according to an embodiment of the invention.

The present invention will now be described with reference to the accompanying figures, wherein the numbered elements in the following written description correspond to like-numbered elements in the figures. An automated warehouse material movement system 10, including a computer based warehouse executive subsystem (WEX) 12 that is programed with computer code and includes multiple application programs 14 to maintain inventory location and quantity information, schedule inventory movement and track inventory movement within the warehouse and the like. System 10 further includes a computer based mobile robot automation subsystem (MAS) 16 that is programed with computer code to maintain information of floor layout of the warehouse, maintain information on mobile robots in the warehouse, allocate and deallocate mobile robots to particular missions, control and track movement of mobile robots and provide situational reporting of the mobile robots and the like. MAS includes an AMR layer 20 that provides direct communication with the AMR vehicles and a traffic control layer 22 that has knowledge of the warehouse layout including traffic paths, obstacles, destination location and the like. Traffic control layer 22 also has awareness of the location of the AMR vehicles and vehicle status. MAS also has an application programming interface (API) layer 24.

WEX includes one or more microservice components 18. One of the microservice components 18a is a vehicle tasking subsystem (VTS) that is programed with computer code to respond to mission commands from the WEX to issue commands 26 to the MAS to reserve and schedule mobile robots including movement of inventory between a source and a destination within the warehouse. The VTS is also programmed to receive report status information 28 from the MAS regarding status of missions. Other possible microservice components include a warehouse execution system (WES) 18b that directs processes that take place in the warehouse such as manages inventory levels and locations in the warehouse. Another possible microservice component is a supply chain execution (SCE) 18c that manages the supply chain functions in the warehouse such as planning, execution and shipping. An interactive microservice component 18 d interfaces VTS component 18a with API 24 of MAS 16 to pass commands 26 from the VTS component to the MAS and reports 28 from the MAS to the VTS component. For the purposes of this discussion, attention will be focused on the vehicle tasking subsystem (VTS) component 18a.

Each microservice component 18 is configured to be tightly designed, stateless and loosely coupled with the WEX and MAS. A tightly defined system provides a concise collection of services that are related to a specific functional purpose. Any function or method which is necessary to the purpose of the system, but could be utilizing another system or library is abstracted, then migrated out of the system. Distinct services within the system are individually testable (i.e., unit tests). The system is externally testable (i.e., verification tests). The system constraints are parametrized to allow for flexible configuration based on use-case needs without modification to its code-base. A loosely coupled system provides a callable service interface and an optional data stream (aka: microservices) that are available to other systems. System interactions are stateless—invocations of microservices do not utilize internal persistence to function correctly. System interactions are secure—interactions between systems are authenticated, authorized and data passed between systems may be encrypted. A stateless systems internal execution cannot be influenced by external actors. A system does not utilize globally owned data-shares that might be modified by an external actor. A system may utilize locally owned data-shares, but not for the purpose of retaining state that modifies internal execution of the system. The system may have persistent datasets (i.e., caches, databases, etc.) that can be referenced during internal execution, if doing so does not modify the internal system.

An advantage of a microservice component is that it is parametrically configured to a particular application which reduces the need for semi-customization of the source code. The code-base remains a static entity while customization is achieved using a component parameterization profile that is specific to an application. Over time, component parameterization may be extended to cover evolving use cases. Thus the cost and time required to create an application specific development is reduced.

Another advantage to microservice components is that actionable grammar is used to describe movement of inventory within a warehouse. Also, a data stream related to the completion of action steps to track movement of inventory within the warehouse.

Figure 2:
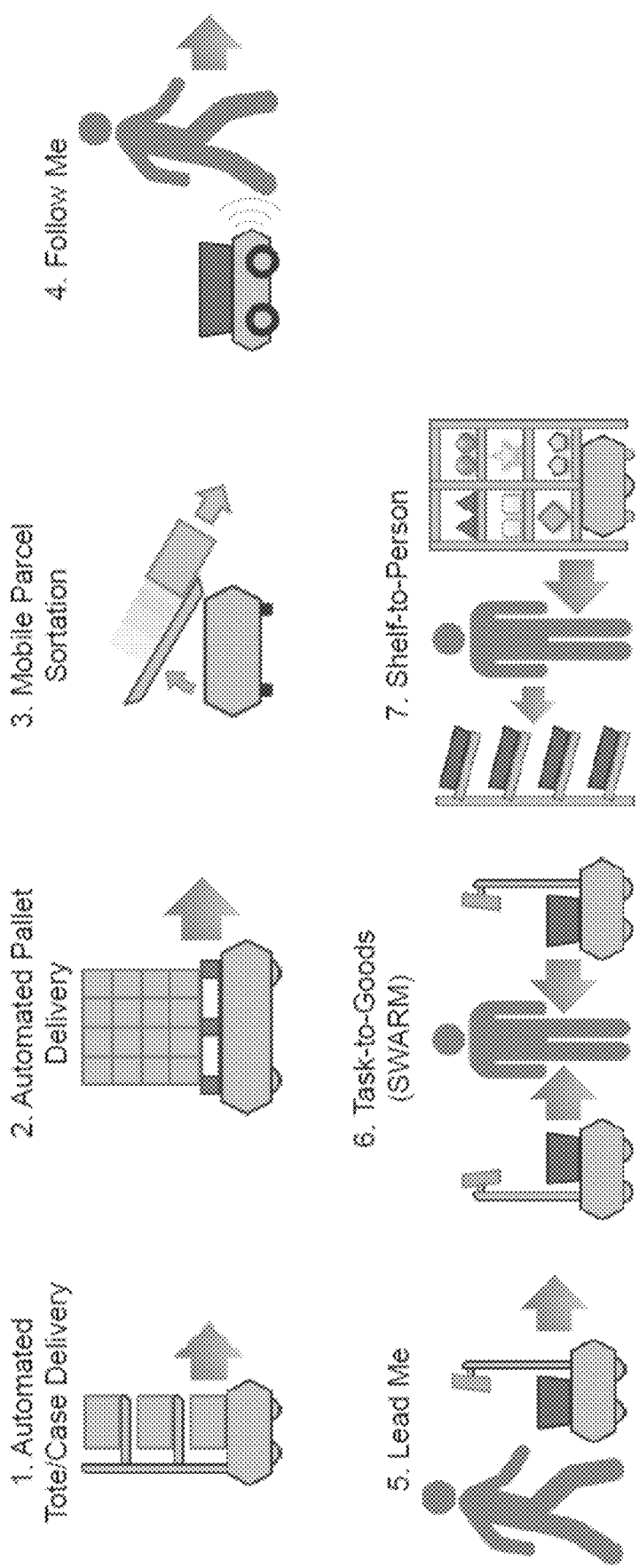
Figure 3:
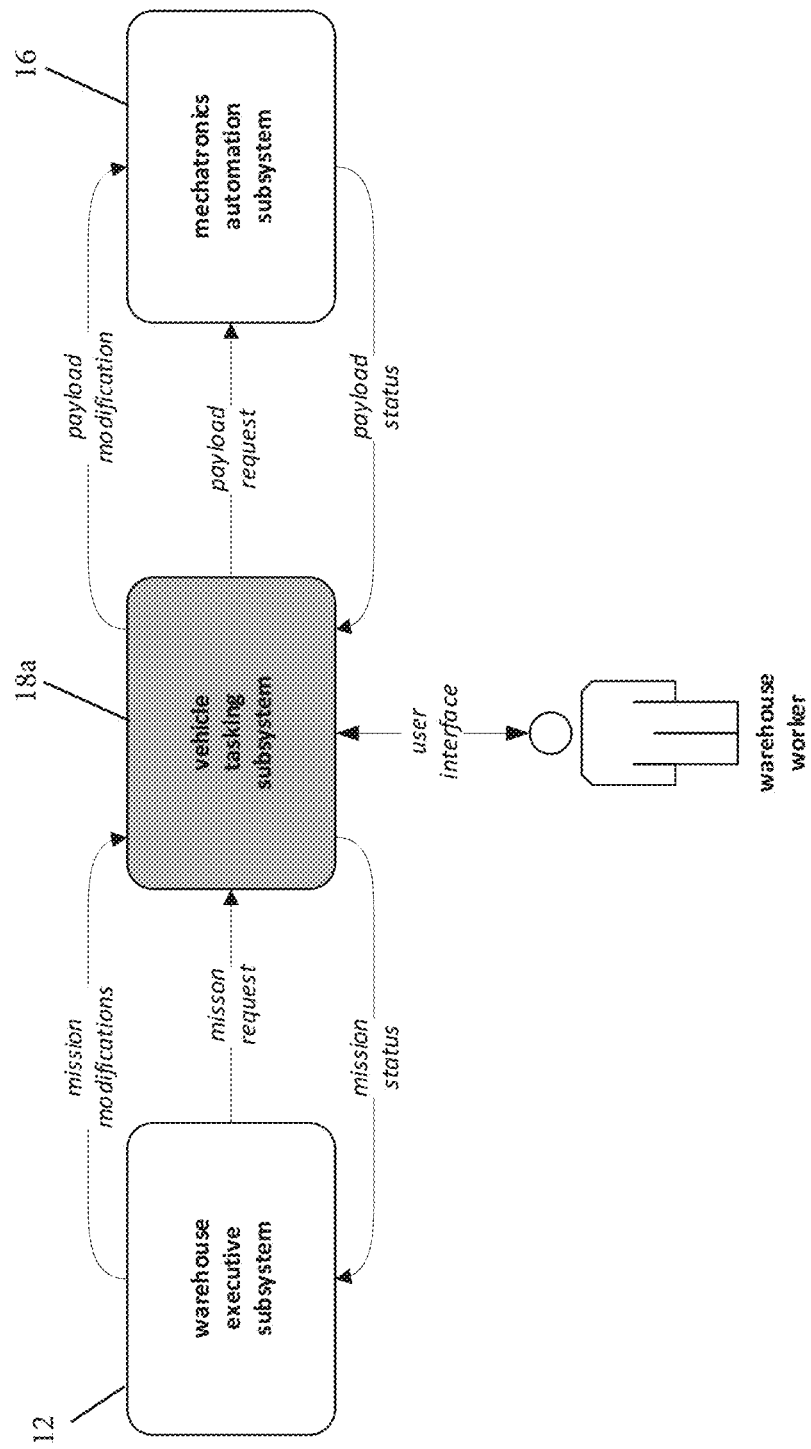
Figure 4:
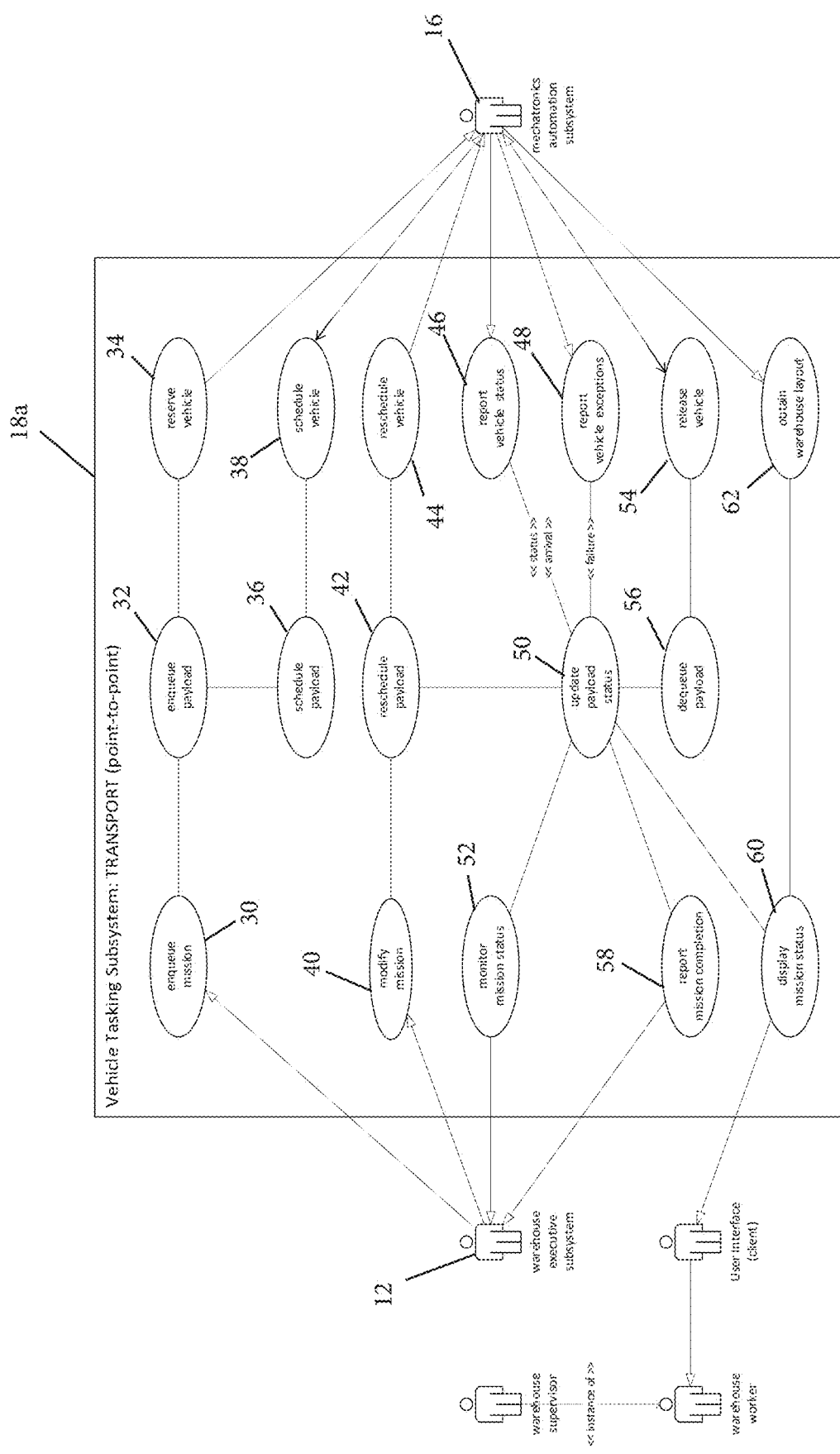

Examples of different types of applications for automated warehouse material movement system 10 is illustrated in FIG. 2. FIG. 2-1 illustrates automated tote or case delivery from one destination to another. It is primarily used for material transport to reduce walking time between areas of the facility. Vehicles, or bots, can move around obstacles autonomously in order to react to a dynamic environment. FIG. 2-2 illustrates automated pallet delivery from one destination to another. It is primarily used for material transport to reduce walking/travel time between areas of the facility. Bots can move around obstacles autonomously in order to react to a dynamic environment. FIG. 2-3 illustrates mobile parcel sortation which utilizes small bots that move around on a grid delivering small parcels, polybags or envelops to destinations within the grid. Packages can be inducted to the bot manually or with a robot. FIG. 2-4 illustrates a bot following a picker through the facility as the picker picks orders. When finished, the bot drives to shipping as a new bot automatically follows the same picker. In FIG. 2-4 the picker is guided to the location for each pick automatically by the bot. The order line is depicted on the screen as to what to pick, the quantity and the destination of the bot. FIG. 2-6 illustrates dynamic fulfilment that allows pickers and bots to move independently in order to create the best utilization of both labor and equipment. Orders may be attached to totes on the bot and the bot moves off on a smart path to fulfill the order(s). Pickers work zones and look for bots that stop within the zone. In FIG. 2-7 bots are dispatched to retrieve storage shelving to a manual workstation in order for the order lines to be filled to the corresponding order. The workstation directs the picker to the appropriate cubby within the shelf and displays a picture of the item to retrieve, the total quantity and the destination at the workstation where to place it.

FIG. 3 illustrated interaction between the warehouse executive subsystem 12 (WEX) the vehicle tasking subsystem 18a (VTS) and mechatronics automation subsystem 16 (MAS). Mission requests are passed from the WEX to the VTS. This results in payload movements being scheduled with the MAS by the VTS. A user interface provided by the VTS augments the overall system by providing monitoring/managing mission payloads within the active movement environment. The VTS manages mission requests from the WEX which a mission describes the movement of a payload between source and destination points within a warehouse. Additionally, the VTS may provide a user interface which allows users to monitor and manage missions and active payloads.

Operation of the vehicle tasking subsystem 18a is illustrated in FIG. 4. The WEX requests to enqueue a mission 30 to crease a mission structure. The VTS creates a payload, associating mission attributes with vehicle handling at 32 and 34. Payload is scheduled at 36 which begins the payload delivery. The MAS schedules the vehicle at 38 which starts vehicle movement for the payload. A modify mission command 40 may also be presented to change the parameters of and existing mission. The VTS modifies the payload attributes of the mission at 42 and the vehicle may be rescheduled at 44 which changes vehicle parameters based on revised payload attributes. When the mission is complete, the MAS releases the vehicle at 54, whereupon the VTS dequeues the payload at 50. The WEX responds by displaying the mission status at 58.

Payload attribute updates are pushed to the VTS from the MAS at 46 and hence to the WEX at 50 and 52. A vehicle alarm, fault or diagnostic message is reported at 48, 50 and 52. Warehouse floor layout and layout updates for the warehouse mission will be tracked is provided to the WEX through the VTS as a one-time event at 60 and 62.

VTS microservice component used in this manner can perform more complex missions. For example, mixed-case palletizing can be accomplished in order to assemble a pallet of mixed cases of item, such as beverages for a grocery store. An empty pallet is retrieved from a specific location and cases loaded to the pallet from several source locations. The filled pallet is then moved to a wrapping workstation to secure the load then moved to the loading dock for shipment. Other examples will be apparent to the skilled artisan.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An automated warehouse material movement system, comprising:
    a plurality of mobile robots disposed within a warehouse;
    a computer based warehouse executive subsystem (WEX) that is programed with computer code that is adapted to maintain inventory location and quantity information, schedule inventory movement and track inventory movement within the warehouse;
    a computer based mobile robot automation subsystem (MAS) that is programed with computer code that is adapted to maintain information of floor layout of the warehouse, maintain information on the mobile robots in the warehouse, allocate and deallocate mobile robots to particular missions, control and track movement of mobile robots and provide situational reporting of the mobile robots;
    a computer based vehicle tasking subsystem (VTS) that is programed with computer code that is adapted to respond to mission commands from the WEX to issue commands to the MAS to reserve and schedule mobile robots including movement of inventory between a source and a destination within the warehouse and to report status information from the MAS to the VTS regarding status of missions; and
    at least one microservice component that is configured to be tightly designed, stateless and loosely coupled with said WEX and MAS, said VTS being said at least one microservice component;
    wherein the WEX is configured to request to enqueue a mission to the VTS to create a mission structure, and wherein the VTS is configured to create a payload request based on attributes of the mission structure for handling of material associated with the payload request by one or more of the mobile robots, and wherein the VTS is configured to issue commands to the MAS for reserving and scheduling the one or more of the mobile robots based on the payload request whereupon the one or more of the mobile robots are moved under control of the MAS to complete the mission.

2. The automated warehouse material movement system as claimed in claim 1 wherein said at least one microservice component is adapted to be parametrically configured to a particular application.

3. The automated warehouse material movement system as claimed in claim 2 wherein said at least one microservice component is adapted to respond to language grammar to produce actionable movement.

4. The automated warehouse material movement system as claimed in claim 1 wherein said at least one microservice component is adapted to respond to language grammar to produce actionable movement.

5. The automated warehouse material movement system as claimed in claim 1 wherein said at least one microservice component is adapted to produce a data stream related to the completion of action steps.

6. The automated warehouse material movement system as claimed in claim 1 wherein said at least one microservice component comprises a plurality of microservice components.

7. The automated warehouse material movement system as claimed in claim 6 wherein said plurality of microservice components comprise at least one chosen from a warehouse execution system and a supply chain execution system.

8. The automated warehouse material movement system as claimed in claim 1 wherein the VTS is operable to modify the mission structure and issue commands to the MAS for rescheduling the one or more mobile robots based on modified attributes for the payload request.

9. The automated warehouse material movement system as claimed in claim 1 wherein the MAS is configured to release control of the one or more mobile robots upon completion of the mission whereupon the VTS is configured to dequeue the payload and report completion of the mission to the WEX.

10. A method of moving material in a warehouse, comprising:
    using a computer based warehouse executive subsystem (WEX) that is programed with computer code, maintaining inventory location and quantity information, schedule inventory movement and tracking inventory movement by a plurality of mobile robots within the warehouse;
    using a computer based mobile robot automation subsystem (MAS) that is programed with computer code, maintaining information of floor layout of the warehouse, maintaining information on the mobile robots in the warehouse, allocating and deallocating mobile robots to particular missions, controlling and tracking movement of the mobile robots and providing situational reporting of the mobile robots;
    using a computer based vehicle tasking subsystem (VTS) that is programed with computer code, responding to mission commands from the WEX to issue commands to the MAS to reserve and schedule mobile robots including movement of inventory between a source and a destination within the warehouse and reporting status information from the MAS to the VTS regarding status of missions; and
    having at least one microservice component that is configured to be tightly designed, stateless and loosely coupled with said WEX and MAS, said VTS being said at least one microservice component;

wherein said method further comprises;

issuing by the WEX to the VTS a request to enqueue a mission to create a mission structure;

creating by the VTS a payload request based on attributes of the mission structure for handling of material associated with the payload request by one or more of the mobile robots;

issuing by the VTS commands to the MAS for reserving and scheduling the one or more of the mobile robots based on the payload request; and moving the one or more of the mobile robots under control of the MAS to complete the mission.

11. The method of moving material in a warehouse as claimed in claim 10 including parametrically configuring said at least one microservice component to a particular application.

12. The method of moving material in a warehouse as claimed in claim 11 including responding to language grammar with said at least one microservice component to produce actionable movement.

13. The method of moving material in a warehouse as claimed in claim 10 including responding to language grammar with said at least one microservice component to produce actionable movement.

14. The method of moving material in a warehouse as claimed in claim 10 including producing a data stream related to the completion of action steps with said at least one microservice component.

15. The method of moving material in a warehouse as claimed in claim 10 wherein said at least one microservice component comprises a plurality of microservice components.

16. The method of moving material in a warehouse as claimed in claim 15 wherein said plurality of microservice components comprise at least one chosen from a warehouse execution system and a supply chain execution system.

17. The method of moving material in a warehouse as claimed in claim 10, further comprising:

modifying the mission structure, wherein said modifying the mission structure comprises modifying attributes of the mission structure by the VTS and issuing by the VTS commands to the MAS for rescheduling the one or more mobile robots based on modified attributes for the payload request.

18. The method of moving material in a warehouse as claimed in claim 10, wherein upon completing the mission by the one or more mobile robots under control of the MAS the method further comprises releasing control of the one or more mobile robots by the MAS and whereupon dequeuing the payload by the VTS and reporting by the VTS completion of the mission to the WEX.

19. The method of moving material in a warehouse as claimed in claim 10, further comprising reporting by the MAS to the VTS the status of the one or more mobile robots operating under control of the MAS to complete the mission, monitoring by the VTS the status of the mission, and providing by the VTS to the WEX the status of the mission.

20. The method of moving material in a warehouse as claimed in claim 19, further comprising obtaining by the VTS a warehouse floor layout for the mission.

* * * * *